(12) United States Patent
Reiffel

(10) Patent No.: US 7,184,075 B2
(45) Date of Patent: Feb. 27, 2007

(54) IMAGED CODED DATA SOURCE TRACKING PRODUCT

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 665 days.

(21) Appl. No.: 10/432,801

(22) PCT Filed: Dec. 10, 2001

(86) PCT No.: PCT/US01/47620

§ 371 (c)(1),
(2), (4) Date: May 27, 2003

(87) PCT Pub. No.: WO02/49344

PCT Pub. Date: Jun. 20, 2002

(65) Prior Publication Data

US 2004/0027455 A1    Feb. 12, 2004

Related U.S. Application Data

(60) Provisional application No. 60/256,086, filed on Dec. 15, 2000, provisional application No. 60/311,803, filed on Aug. 13, 2001, provisional application No. 60/318,961, filed on Sep. 11, 2001.

(51) Int. Cl.
*H04N 5/225* (2006.01)

(52) U.S. Cl. ....................... 348/169; 348/207; 348/174; 348/143; 235/462.08; 235/462.11; 235/462.1; 235/462.14; 235/462.41; 235/462.45; 235/472.01

(58) Field of Classification Search ................ 348/169, 348/207, 174, 143; 235/462.08, 462.11, 235/462.1, 462.14, 462.41, 462.45, 472.01
See application file for complete search history.

(56) References Cited

U.S. PATENT DOCUMENTS

| | | | |
|---|---|---|---|
| 4,053,233 A | 10/1977 | Bien et al. |
| 4,099,050 A | 7/1978 | Sauermann |
| 4,228,430 A | 10/1980 | Iwamura et al. |
| 4,439,672 A | 3/1984 | Salaman |
| 4,603,231 A | 7/1986 | Reiffel et al. |
| 4,637,797 A | 1/1987 | Whitney et al. |
| 4,650,334 A | 3/1987 | Alster et al. |
| 4,684,349 A | 8/1987 | Ferguson et al. |

(Continued)

FOREIGN PATENT DOCUMENTS

EP    0 062 473    10/1982

(Continued)

*Primary Examiner*—Shawn S. An
(74) *Attorney, Agent, or Firm*—William J. Hallihan; Amin Hallihan, LLC

(57) ABSTRACT

The tracking product images several coded data sources (41A–41C) concurrently to cause a track signal (12) which represents each of the several coded data source locations and represents each of the several coded data source identities.

23 Claims, 2 Drawing Sheets

U.S. PATENT DOCUMENTS

Figure 1:
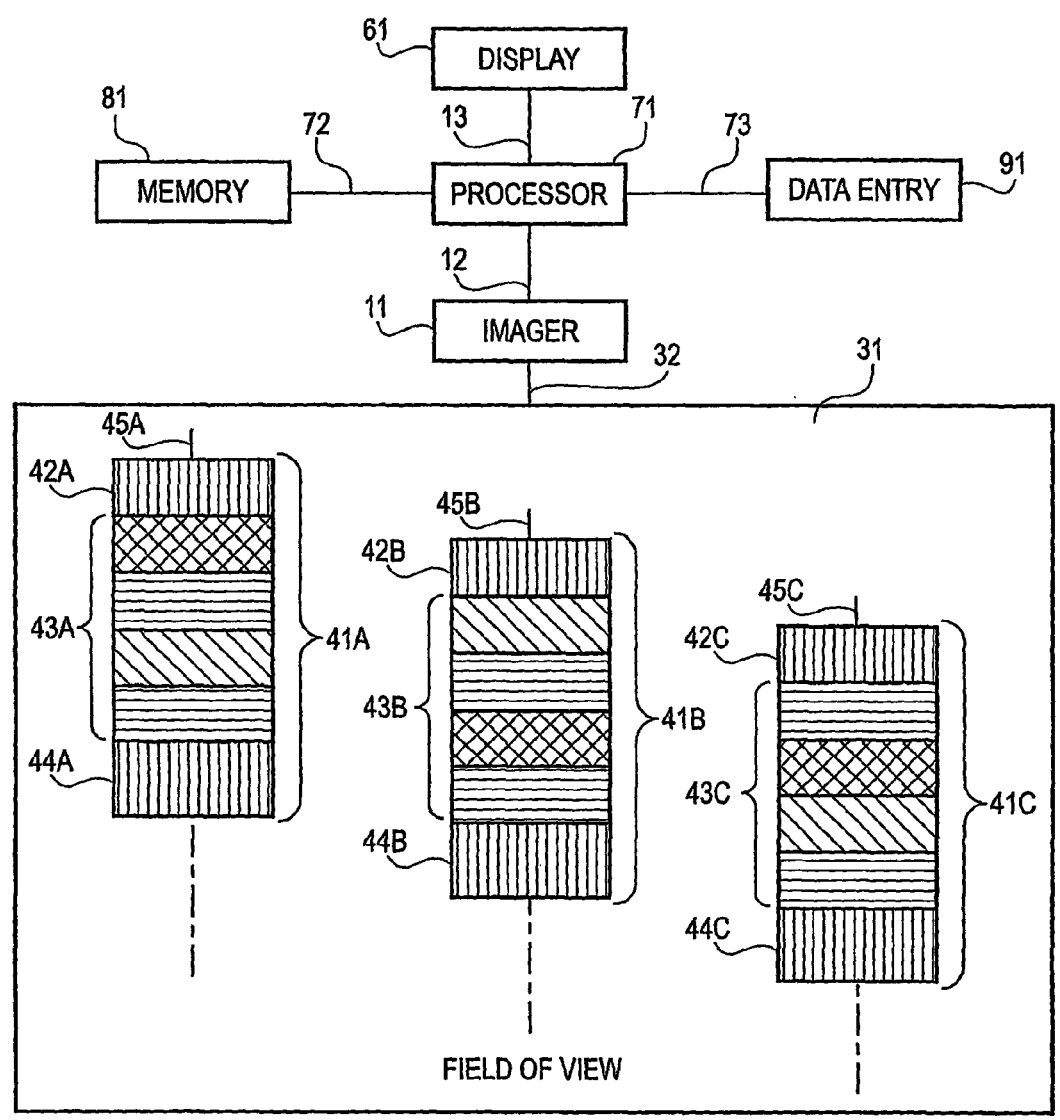

| | | | |
|---|---|---|---|
| 4,806,741 A * | 2/1989 | Robertson ................ 235/462.1 | |
| 4,945,914 A | 8/1990 | Allen | |
| 4,998,441 A | 3/1991 | Stuart | |
| 5,107,350 A | 4/1992 | Omori | |
| 5,111,410 A | 5/1992 | Nakayama et al. | |
| 5,181,015 A | 1/1993 | Marshall et al. | |
| 5,214,414 A | 5/1993 | Levine et al. | |
| 5,260,556 A | 11/1993 | Lake et al. | |
| 5,282,045 A | 1/1994 | Mimura et al. | |
| 5,415,553 A | 5/1995 | Szmidla | |
| 5,448,261 A | 9/1995 | Koike et al. | |
| 5,453,015 A | 9/1995 | Vogel | |
| 5,483,052 A * | 1/1996 | Smith et al. ........... 235/462.49 | |
| 5,507,527 A | 4/1996 | Tomioka et al. | |
| 5,537,211 A | 7/1996 | Dial | |
| 5,563,401 A | 10/1996 | Lemelson | |
| 5,644,126 A | 7/1997 | Ogawa | |
| 5,710,416 A | 1/1998 | Belknap et al. | |
| 5,712,658 A | 1/1998 | Arita et al. | |
| 5,729,220 A | 3/1998 | Russell | |
| 5,756,981 A | 5/1998 | Roustaei et al. | |
| 5,789,732 A | 8/1998 | McMahon et al. | |
| 5,795,161 A | 8/1998 | Vogel | |
| 5,821,523 A | 10/1998 | Bunte et al. | |
| 5,822,735 A | 10/1998 | De Lapa et al. | |
| 5,825,045 A | 10/1998 | Koenck et al. | |
| 5,826,578 A | 10/1998 | Curchod | |
| 5,835,237 A | 11/1998 | Ebrahimi | |
| 5,852,211 A | 12/1998 | Dumpelmann et al. | |
| 5,852,823 A | 12/1998 | De Bonet | |
| 5,867,265 A | 2/1999 | Thomas | |
| 5,912,700 A | 6/1999 | Honey et al. | |
| 5,917,472 A | 6/1999 | Perala | |
| 5,917,486 A | 6/1999 | Rylander | |
| 5,963,145 A | 10/1999 | Escobosa | |
| 5,982,352 A | 11/1999 | Pryor | |
| 5,988,505 A | 11/1999 | Shellhammer | |
| 6,000,612 A | 12/1999 | Zhu | |
| 6,047,893 A | 4/2000 | Saporetti | |
| 6,048,117 A | 4/2000 | Banton | |
| 6,056,199 A | 5/2000 | Wiklof et al. | |
| 6,082,619 A | 7/2000 | Ma et al. | |
| 6,118,848 A | 9/2000 | Reiffel | |
| 6,121,953 A | 9/2000 | Walker | |
| 6,155,489 A | 12/2000 | Collins, Jr. et al. | |
| 6,163,946 A | 12/2000 | Pryor | |
| 6,167,607 B1 | 1/2001 | Pryor | |
| 6,301,763 B1 | 10/2001 | Pryor | |
| 6,311,214 B1 | 10/2001 | Rhoads | |
| 6,314,631 B1 | 11/2001 | Pryor | |
| 6,317,118 B1 | 11/2001 | Yoneno | |
| 6,317,953 B1 | 11/2001 | Pryor | |
| 6,330,973 B1 | 12/2001 | Bridgelall et al. | |
| 6,335,685 B1 | 1/2002 | Schrott et al. | |
| 6,542,083 B1 | 4/2003 | Richley et al. | |
| 6,545,670 B1 | 4/2003 | Pryor | |
| 6,708,885 B2 | 3/2004 | Reiffel | |
| 6,720,949 B1 | 4/2004 | Pryor et al. | |
| 6,750,848 B1 | 6/2004 | Pryor | |
| 6,766,036 B1 | 7/2004 | Pryor | |
| 2002/0036617 A1 | 3/2002 | Pryor | |
| 2002/0183961 A1 | 12/2002 | French et al. | |
| 2003/0222145 A1 | 12/2003 | Reiffel | |
| 2004/0027455 A1 | 2/2004 | Reiffel | |
| 2004/0041027 A1 | 3/2004 | Reiffel | |
| 2004/0125224 A1 | 7/2004 | Reiffel | |
| 2004/0135766 A1 | 7/2004 | Reiffel | |
| 2004/0188525 A1 | 9/2004 | Reiffel | |
| 2004/0195327 A1 | 10/2004 | Reiffel | |

FOREIGN PATENT DOCUMENTS

| | | |
|---|---|---|
| EP | 0 840 248 | 5/1998 |
| EP | 1 020 810 | 7/2000 |
| FR | 2 694 827 | 2/1994 |
| JP | 11-143629 | 5/1999 |
| WO | WO 87/07106 | 11/1987 |
| WO | WO 93/18478 | 9/1993 |
| WO | WO 96/32690 | 10/1996 |
| WO | WO 99/36836 | 7/1999 |
| WO | WO 99/66441 | 12/1999 |

* cited by examiner

IMAGED CODED DATA SOURCE TRACKING PRODUCT

This application claims benefit of U.S. provisional application 60/256,086 filed 15 Dec. 2000, U.S. provisional application 60/311,803 filed 13 Aug. 2001, and U.S. provisional application 60/318,961 filed 11 Sep. 2001.

The tracking product images coded data sources to cause a track signal which represents the coded data source locations and the coded data source identities.

Coded data source locations can represent locations of objects. Coded data source identities can represent identities of the objects.

Object identities can be represented generically. Examples are: text, a building, a door, a vehicle, a person, a container.

Object identities can be represented specifically. Examples are: specific instructions, a specific building, a specific address, a specific vehicle, a specific person, a specific container.

Imagers can be fixed in an environment. Imagers can be hand-held and can be worn. Data can be input to an imager to cause the imager to execute various applications.

The product can be used for security, safety, rehabilitation, finding, tracking, guiding, and various and numerous other cases. Specific examples are: giving a warning when an object is near, giving a warning when a child is approaching a dangerous object, finding an object—which can be a person—in a cluttered environment, tracking vehicles to optimize traffic flow, guiding a person—and a robot— through an unfamiliar environment.

The invention provides progress over prior art shown for example in U.S. Pat. No. 5,912,700 by Honey 15 Jun. 1999, U.S. Pat. No. 4,998,441 by Stuart 12, Mar. 1991, U.S. Pat. No. 4,099,050 by Sauermann 4, Jul. 1978, and U.S. Pat. No. 4,053,233 by Bein 11, Oct. 1977.

FIG. 1 schematically depicts the product.

Figure 2:
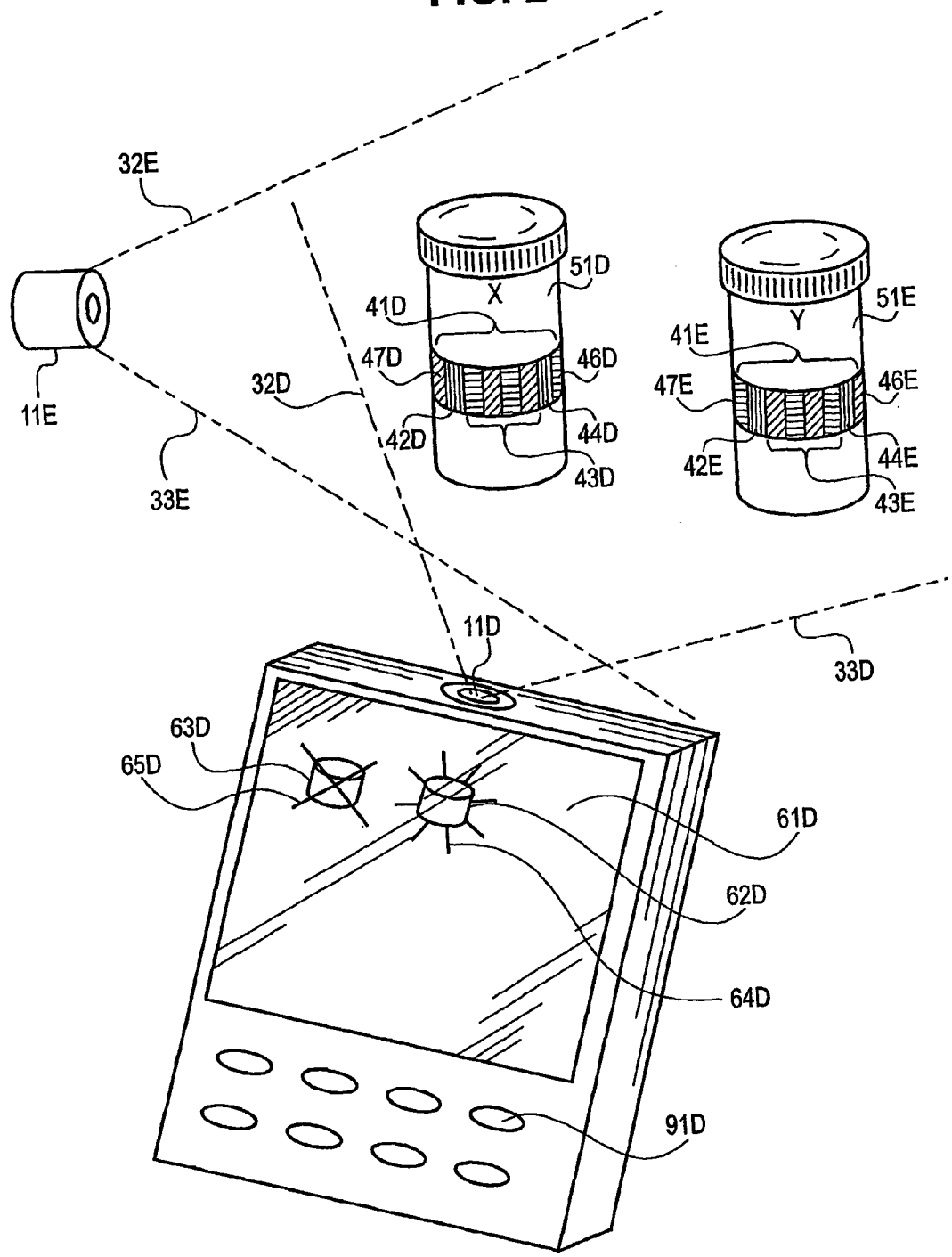

FIG. 2 depicts a personal form of the product used to distinguish containers.

The product comprises a plurality of coded data sources and comprises an imager. The imager 11 has a field of view 31 extending along each of three orthogonal axes. The imager is adapted to concurrently detect light 32 from several coded data sources from the plurality of coded data sources when the several coded data sources are spatially separated in the field of view—for example the several coded data sources 41A, 41B, 41C.

"Detect light" here and throughout means not only detecting the presence of light but also means detecting the specific properties of the light which encode data so that the imager can cause a signal which represents the encoded data. Detecting light concurrently from several data sources distinguishes the imager from a bar code reader which can not concurrently detect light from several spatially separated bar codes.

A first coded data source 41A from the plurality of coded data sources can be in the field of view at a first coded data source location relative to at least one reference point in the field of view. The first coded data source represents a first coded data source identity. While all the coded data sources can use patterns of the same physical property—such as patterns of color bands—to represent identities, the first identity is represented by the first coded data source without any physical nor spatial nor temporal dependence on the representation of a second identity by a second coded data source from the plurality of coded data sources.

A first track signal—for example 12—is caused when the imager detects light from the first coded data source. The first track signal represents the first coded data source location relative to at least one reference point The first track signal represents the first coded data source identity.

Reference points can be properties—such as boundaries—of the field of view. Reference points can be properties—such as pixel location—of the imager. Reference points can be coded data sources in the field of view—such as X Y in FIG. 3. These reference point coded data sources can be fixed and can be moving in the field of view. The field of view can be fixed and can be moving.

The imager can be a personal imager manipulated by a person as depicted in FIG. 2. The personal imager can be part of a device such as a cell phone and a computer. The imager can be a part of an environment as depicted in FIG. 3, and can be fixed and can be moving in the environment.

The imager can be the dual mode imager of patent application PCTUS/01/13742 filed 30 Apr. 2001 and published as WO 01/84475 A1 Nov. 8, 2001. The coded data sources depicted in FIG. 1 are a form which works well with the dual mode imager. The bands 42A, 42B, 42C and 44A, 44B, 44C retro reflect infra red light. The locate mode of the dual mode imager detects these bands. The react mode of the dual mode imager detects light from the regions 43A, 43B, 43C. The 42A, 42B, 42C bands are wider than the 44A, 44B, 44C bands which defines directed axes 45A, 45B, 45C. Other imagers and other forms of coded data sources can be used.

The imager—dual mode and otherwise—can have components—11F, 11G for example—separated in space. This can enlarge the field of view. This can facilitate determining the locations of coded data sources relative to reference points.

The imager can have several elements which selectively detect portions of a range of values of a physical property of light from a coded data source, with the several portions detected by the several imager elements being combined to detect the full range of the physical property of light without forming an image of the coded data source.

Light from a coded data source can have various sources such as light reflected from ambient sources; a coded data source light source; light emitted after energizing by suitable radiation; light emitted with a characteristic decay time after energizing by suitable radiation; a light source adjacent to the imager illuminating the coded data source; and combinations of two and more of these.

Light is not limited to visible light. For example, infrared can be used, and millimeter and longer wavelengths can be used. Light can be radiating energy from any portion of the electromagnetic spectrum which can provide the functions required here. Other forms of radiating energy—such as acoustic energy—which can provide the functions required here are included in the meaning of "light" here.

The track signal 12 can be used to generate track data. Generation of track data can be caused via a processor 71 which is signal connected 12 to the imager. A memory 81 can be signal connected 72 to the processor. A data entry means 91 can be signal connected 73 to the processor.

Track data represent the track signal and thus represent the location and identity of each of the several coded data sources in the field of view. Track data can also represent information stored in the memory about each of the several coded data sources in the field of view. Track data can be stored in the memory for uses such as use in another application and use at a later time.

A display 61 can be signal connected 13 to the imager. The display can output display data representing the track data. The display can output display data in registration with an ordinary image of an environment.

The display can have any of various forms. The display can be a personal display. A personal display can be any of various devices such as a cell phone and a computer. The display can be a public display. A public display can be a large display which can be perceived by many persons. A public display can be projected to a location close to a person so that his display can be perceived by the person and only also by other persons close to the person.

The display can be various combinations of two and more of these. The display form can be tailored to the needs and wants of various persons using the product.

The display can be any data output means which can be perceived by a person such as visual, audible, and tactile means. The display can be combinations of these means. The display can be achieved by motions of a robot. The data output means can be tailored to the needs and wants of various persons indicating objects.

The memory can have identity data which relates coded data source codes to object identities. Identity data can be entered to the memory by any data entry means such as via keys 91D. The memory can be—in part at least—a distributed memory accessed via a networked information system.

The memory can have reply data associated with a coded data source identity. A first query can be entered via the data entry means to solicit first reply data about a first coded data source. This can be used to cause the display to output at least part of the first reply data The tracking product can be used with other identifying and locating means such as infra red systems, radio frequency systems such as radio frequency identity stags, global positioning satellite systems, and barcode systems. Identity data can—for example—be entered via any of these, other identifying means, and combinations thereof.

Any—and all—of the processor, memory, data entry means, and display can—in part at least—be integral with the imager. Any—and all—of the processor, memory, data entry means, and display can—in part at least—be constituents of a distributed system which is signal connected via a networked information system.

Coded data sources—41D, 42D, 43D, 44D, and 41E, 42E, 43E, 44E for example—can be associated with a container—51D, 51E—in the field of view 32D, 33D of a personal imager 11D as depicted in FIG. 2. The tracking product can find a desired medication container among several medication containers.

Here the display 61D can indicate a desired container by highlighting 64D an image 62D of the container, by illuminating the container, and by various other means. The display can also indicate 63D, 65D a container which would be selected erroneously. Display data can also identify the container and can provide information about the container such as correct usage of the medication.

A coded data source can be on the medication itself when the medication is in pill form. In cases—like choosing a pill—which are highly controlled and where the field of view can be very small, then coded data sources can be very small.

In the medication case—and in various and numerous other cases where there is danger that objects can be moved erroneously and can be handled without proper authorization—there can be an imager 11E associated with the environment of the objects. Then display data can warn if an object is being moved erroneously and can warn if an object is being handled without proper authorization.

In safety and security cases coded data sources can be associated with persons so that a person not having a coded data source identifying that person as being authorized to enter an a restricted area will be detected by the product.

A coded data source can be associated with a child. The coded data source can be part of a garment worn by the child. Other coded data sources can be associated with objects and locations in the environment the child is in. The display can warn if the child is approaching an unsafe object and an unsafe part of the environment.

A coded data source can be associated with an object which will be moved automatically by machinery—such as a shell in a magazine. Several kinds of shells can be stored together and the tracking product can identify each, locate each, and track each. Track data can keep an object from being handled erroneously. Track data can represent the disposition of each object from manufacture to use.

When an object has cylindrical symmetry—such as the containers in FIG. 2 the coded data source can have cylindrically symmetric redundancy so that the coded data source can be imaged with the object in various orientations in the field of view. On the containers beginnings 46D, 46E—and the ends 47D, 47E—of code repeats are depicted.

A coded data source can be on a vehicle so that the product can track the locations of the vehicle. The product can comprise a plurality of imagers. The plurality of imagers can have a joint field of view which can cover at least places where the vehicle should not be. Places where the vehicle should not be can comprise places where dangerous materials can be loaded and places where dangerous materials should not be.

A coded data source can be associated with text This coded data source could be a generic coded data source which indicates only that text is adjacent. The product can be combined with optical character recognition so that the product can provide a display representing the text. This display can use a sensory pathway—such as audible and tactile pathways—other than vision. This generic coded data source can be associated with any text and characters which can be deciphered via optical character recognition.

A generic coded data source can indicate that an environment is safe. A generic coded data source can indicate that an environment is not safe. The product can display the distance between any coded data source and a person. The product can display directions along a path between a person and any coded data source. The product can be used with an information system which can generate a path from a starting point to a target point with the path optimized by distance traveled, time traveled, and other criteria.

A "signal" from a first product part to a second product part and a first product part being "signal connected" with a second product part here, and throughout, mean that a first physical state of the first product part causes a second physical state of the second product part. This can occur by various direct causal means and can occur by any of various transmission means. Transmitted signals can be any of various point-to-point and broadcast forms of energy transmission such as wireless and via wires, cables, and fibers. Parts of transmitted signals can reside with one form of the transmitted signal, parts can reside with a second form of transmitted signal, and parts can reside with various combinations of transmitted signals.

The several causes here can act via any of various processing modes. The processing can utilize configured processing elements such as fixed circuits, can utilize configurable processing elements such as field programmable gate arrays and neural networks, can utilize instructions in a data-bearing medium, and can utilize combinations of these. The processing be stand alone, can act via a local information system, can act via a networked information system, and can act via combinations of these.

The invention claimed is:

1. A tracking product comprising:
a plurality of coded data sources;
an imager,
the imager having a field of view,
the field of view extending along each of three orthogonal axes,
the field of view having a reference point,
the imager being adapted to detect light concurrently from several coded data sources from the plurality of coded data sources when the several coded data sources are spatially separated in the field of view;
a first coded data source from the plurality of coded data sources,
the first coded data source being in the field of view at a first coded data source location relative to the reference point,
the first coded data source representing a first coded data source identity,
the first identity being represented by the first coded data source without any physical nor spatial nor temporal dependence on the representation of a second identity by a second coded data source from the plurality of coded data sources;
a first track signal,
the first track signal being caused when light from the first coded data source is detected by the imager,
the first track signal representing the first coded data source identity,
the first track signal representing the first coded data source location relative to the reference point.

2. The product of claim 1 wherein the light from the first coded data source is reflected by the first coded data source.

3. The product of claim 1 wherein the imager is adapted to being held by a person.

4. The product of claim 1 wherein the imager is associated with an environment independently of persons in the environment.

5. The product of claim 4 further comprising a display representing at least part of the first track signal.

6. The product of claim 5 wherein the display is adapted to being held by a person.

7. The product of claim 6 wherein the display is associated with an environment independently of persons in the environment.

8. The product of claim 5 wherein a first query solicits first reply data about the first coded data source and wherein the display is caused to output at least part of the first reply data.

9. A tracking product comprising:
a plurality of coded data sources;
an imager,
the imager having a field of view,
the field of view extending along each of three orthogonal axes,
the field of view having a reference point,
the imager being adapted to detect light concurrently from several coded data sources from the plurality of coded data sources when the several coded data sources are spatially separated in the field of view;
a first coded data source from the plurality of coded data sources,
the first coded data source being in the field of view at a first coded data source location relative to the reference point,
the first coded data source representing a first coded data source identity,
the first identity being represented by the first coded data source without any physical nor spatial nor temporal dependence on the representation of a second identity by a second coded data source from the plurality of coded data sources;
a first track signal,
the first track signal being caused when light reflected from the first coded data source is detected by the imager,
the first track signal representing the first coded data source identity,
the first track signal representing the first coded data source location relative to the reference point.

10. The product of claim 9 wherein the imager is adapted to being held by a person.

11. The product of claim 9 wherein the imager is associated with an environment independently of persons in the environment.

12. The product of claim 11 further comprising a display representing at least part of the first track signal.

13. The product of claim 12 wherein the display is adapted to being held by a person.

14. The product of claim 12 wherein the display is associated with an environment independently of persons in the environment.

15. The product of claim 12 wherein a first query solicits first reply data about the first coded data source and wherein the display is caused to output at least part of the first reply data.

16. A tracking product comprising:
a plurality of coded data sources;
an imager,
the imager adapted to being held by a person,
the imager having a field of view,
the field of view extending along each of three orthogonal axes,
the field of view having a reference point,
the imager being adapted to detect light concurrently from several coded data sources from the plurality of coded data sources when the several coded data sources are spatially separated in the field of view;
a first coded data source from the plurality of coded data sources,
the first coded data source being in the field of view at a first coded data source location relative to the reference point,
the first coded data source representing a first coded data source identity
the first identity being represented by the first coded data source without any physical nor spatial nor temporal dependence on the representation of a second identity by a second coded data source from the plurality of coded data sources;
a first track signal,
the first track signal being caused when light from the first coded data source is detected by the imager,
the first track signal representing the first coded data source identity,
the first track signal representing the first coded data source location relative to the reference point;
a display representing at least part of the first track signal.

17. The product of claim 16 wherein the display is adapted to being held by a person.

18. The product of claim 16 wherein the display is associated with an environment independently of persons in the environment.

19. The product of claim 16 wherein a first query solicits first reply data about the first coded data source and wherein the display is caused to output at least part of the first reply data.

20. A tracking product comprising:
a plurality of coded data sources;
an imager,
the imager adapted to being associated with an environment independently of people in the environment,
the imager having a field of view,
the field of view extending along each of three orthogonal axes,
the field of view having a reference point,
the imager being adapted to detect light concurrently from several coded data sources from the plurality of coded data sources when the several coded data sources are spatially separated in the field of view;
a first coded data source from the plurality of coded data sources,
the first coded data source being in the field of view at a first coded data source location relative to the reference point,
the first coded data source representing a first coded data source identity
the first identity being represented by the first coded data source without any physical nor spatial nor temporal dependence on the representation of a second identity by a second coded data source from the plurality of coded data sources;
a first track signal,
the first track signal being caused when light from the first coded data source is detected by the imager,
the first track signal representing the first coded data source identity,
the first track signal representing the first coded data source location relative to the reference point;
a display,
the display representing at least part of the first track signal.

21. The product of claim 20 wherein the display is adapted to being held by a person.

22. The product of claim 20 wherein the display is associated with an environment independently of persons in the environment.

23. The product of claim 20 wherein a first query solicits first reply data about the first coded data source and wherein the display is caused to output at least part of the first reply data.

* * * * *